(12) United States Patent
MacGougan et al.

(10) Patent No.: US 8,938,262 B2
(45) Date of Patent: Jan. 20, 2015

(54) NEIGHBOR CELL LOCATION AVERAGING

(75) Inventors: Glenn Donald MacGougan, San Jose, CA (US); Lukas M. Marti, Santa Clara, CA (US); Robert Mayor, Half Moon Bay, CA (US); Ronald K. Huang, San Jose, CA (US); Jason Dere, San Jose, CA (US); Yefim Grosman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/153,113

(22) Filed: Jun. 3, 2011

(65) Prior Publication Data
US 2012/0309387 A1    Dec. 6, 2012

(51) Int. Cl.
*H04W 24/00* (2009.01)
*H04W 64/00* (2009.01)
*H04W 88/08* (2009.01)

(52) U.S. Cl.
CPC ............. *H04W 64/00* (2013.01); *H04W 88/08* (2013.01)
USPC ...................... 455/456.6; 455/425; 455/456.1

(58) Field of Classification Search
CPC ....... H04W 4/02; H04W 64/00; H04W 24/00; G01S 5/00; G01S 5/0009; G01S 5/0045; G01S 5/0063
USPC ................ 455/524, 456.1–457, 404.1–404.2, 455/423–425; 370/310.2, 328, 338
See application file for complete search history.

(56) References Cited

U.S. PATENT DOCUMENTS

| | | |
|---|---|---|
| 2003/0125046 A1 | 7/2003 | Riley et al. |
| 2004/0087316 A1 | 5/2004 | Caci |
| 2004/0157621 A1 * | 8/2004 | Yamasaki et al. .......... 455/456.1 |
| 2005/0090266 A1 * | 4/2005 | Sheynblat ................. 455/456.1 |
| 2008/0108371 A1 * | 5/2008 | Alizadeh-Shabdiz et al. .......... 455/456.1 |
| 2009/0005083 A1 | 1/2009 | Hoshino et al. |
| 2009/0011779 A1 * | 1/2009 | MacNaughtan et al. ... 455/456.6 |

(Continued)

FOREIGN PATENT DOCUMENTS

| | | |
|---|---|---|
| JP | 2002-243827 | 8/2002 |
| JP | 2003-535345 | 11/2003 |

(Continued)

OTHER PUBLICATIONS

Invitation to Pay Additional Fees issued in international application No. PCT/US2012/038089, Aug. 7, 2012, 7 pages.

(Continued)

*Primary Examiner* — Michael Mapa
(74) *Attorney, Agent, or Firm* — Fish & Richardson P.C.

(57) ABSTRACT

In some implementations, a location of a mobile device can be determined by calculating an average of the locations of wireless signal transmitters that have transmitted signals received by the mobile device. In some implementations, locations are weighted with coefficients and the average is a weighted average. In some implementations, the locations of the wireless signal transmitters are determined based on identification information encoded in the wireless signals received by the mobile device. The identification information can include an identifier for a wireless signal transmitter. The identification information can include characteristics of the received wireless signal that can be used to identify wireless signal transmitters. In some implementations, identification information from one signal can be combined with identification information from another signal to determine a location of a wireless transmitter.

21 Claims, 5 Drawing Sheets

(56) References Cited

U.S. PATENT DOCUMENTS

| | | |
|---|---|---|
| 2009/0075651 A1* | 3/2009 | MacNaughtan et al. ...... 455/434 |
| 2010/0081451 A1 | 4/2010 | Mueck et al. |
| 2010/0178934 A1 | 7/2010 | Moeglein |
| 2011/0009129 A1 | 1/2011 | Lim |
| 2011/0039520 A1* | 2/2011 | Maida et al. ................... 455/411 |
| 2011/0039575 A1* | 2/2011 | Castillo et al. ............. 455/456.1 |
| 2011/0045840 A1* | 2/2011 | Alizadeh-Shabdiz et al. .......................... 455/456.1 |
| 2011/0069627 A1* | 3/2011 | Sridhara et al. ............... 370/252 |

FOREIGN PATENT DOCUMENTS

| | | |
|---|---|---|
| JP | 2007-538265 | 12/2007 |
| WO | 2004/016032 A1 | 2/2004 |
| WO | WO2004/016032 A1 | 2/2004 |
| WO | WO2006/031035 A1 | 3/2006 |
| WO | WO2006/044931 A1 | 4/2006 |
| WO | 2010/081537 A1 | 7/2010 |
| WO | WO2010/081537 A1 | 7/2010 |

OTHER PUBLICATIONS

International Search Report and Written Opinion of the International Searching Authority issued in International Application No. PCT/US2012/038089, Nov. 14, 2012, 18 pages.

* cited by examiner

US 8,938,262 B2

NEIGHBOR CELL LOCATION AVERAGING

TECHNICAL FIELD

The disclosure generally relates to location estimation.

BACKGROUND

Modern mobile devices (e.g., smartphones, laptops, etc.) can provide to a user of the mobile device the current location of the mobile device. The current location of the mobile device can be useful for providing various location based services. For example, the current location can be used to provide mapping services (e.g., directions) to the user. Often global navigation satellite system (GNSS) data is used (e.g., GPS data) to determine the current location of the mobile device. It may be useful to be able to determine the current location of the device without having to rely on GNSS data.

SUMMARY

In some implementations, a location of a mobile device can be determined by calculating an average of the locations of wireless signal transmitters that have transmitted signals received by the mobile device. In some implementations, locations are weighted with coefficients and the average is a weighted average.

In some implementations, the locations of the wireless signal transmitters are determined based on identification information encoded in the wireless signals received by the mobile device. The locations of the wireless signal transmitters can be determined by comparing the identification information to wireless signal transmitter information stored on the mobile device. The identification information can include an identifier for a wireless signal transmitter. The identification information can include characteristics or properties of the received wireless signal that can be used to identify wireless signal transmitters. In some implementations, identification information from one signal can be combined with location information from another signal to uniquely identify a location of a wireless transmitter.

Particular implementations provide one or more of the following advantages: location estimation can be performed on the mobile device; location estimation for a mobile device can be calculated based on the positions of neighboring transmitters; a location of the mobile device can be determined without relying on GNSS data.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Example Device

Figure 1:
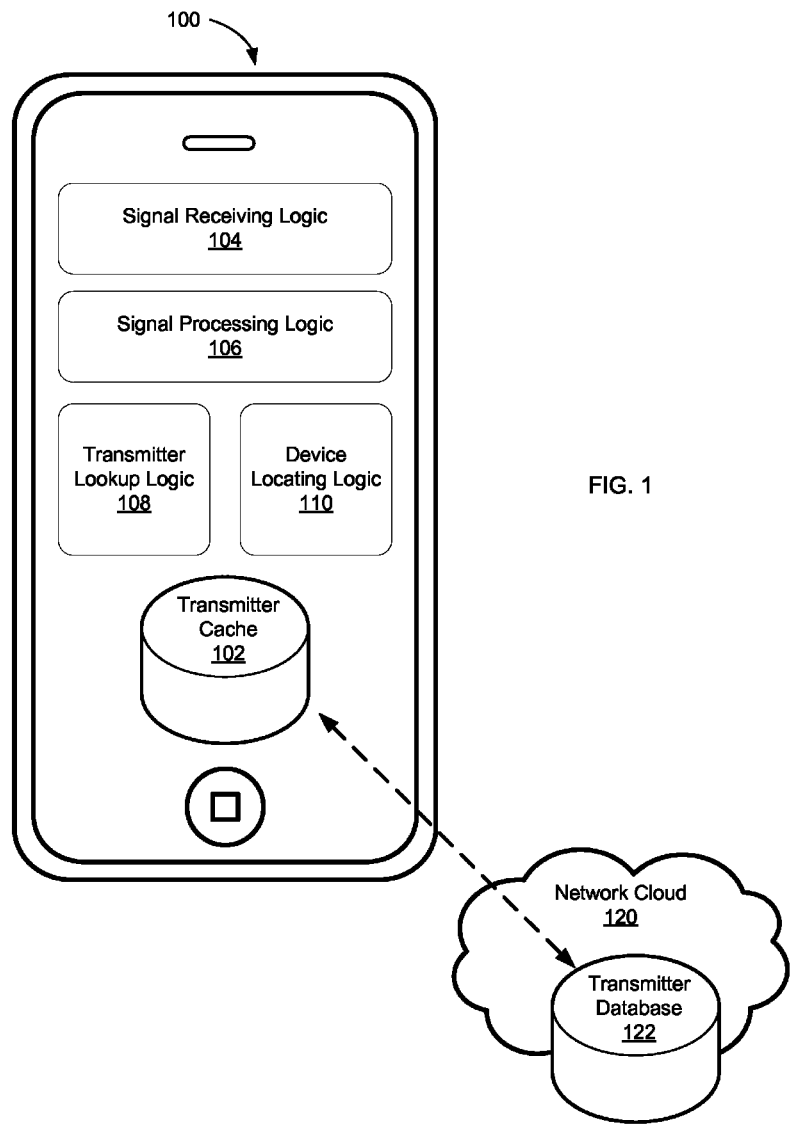
FIG. 1 illustrates an example mobile device that performs neighbor cell location averaging.

FIG. 1 illustrates an example mobile device 100 that performs neighbor cell location averaging. For example, mobile device 100 can include transmitter cache 102. Transmitter cache 102 can include information for identifying and locating wireless signal transmitters. Wireless signal transmitters can be cellular transmitters. For example, wireless signal transmitters can include cellular transmitters that transmit code division multiple access (CDMA) signals, global system for mobile communication (GSM) signals or universal mobile telecommunications system (UMTS) signals. Wireless transmitters can be wireless access points.

In some implementations, mobile device 100 can receive wireless transmitter information from transmitter database 122 located in network cloud 120 and store the wireless transmitter information in a transmitter cache 102 on mobile device 100. Transmitter cache 102 can be configured to store a portion of the wireless transmitter information stored in transmitter database 122. For example, transmitter cache 102 can be configured to store wireless transmitter information for a particular geographic region in which mobile device 100 is currently located. Transmitter cache 102 can be updated with new transmitter information from transmitter database 122 on a periodic basis (e.g., annually).

In some implementations, transmitter cache 102 can store a unique identifier, location information and non-unique signal characteristics for the transmitter for each wireless transmitter in wireless transmitter cache 102. For example, a unique identifier for a cellular transmitter can be a cellular transmitter identifier (e.g., serving cell identifier). A unique identifier for an access point can be a service set identifier (SSID) or a media access control (MAC) address. Location information can include latitude and longitude coordinates for the wireless signal transmitter. Non-unique signal characteristics can include a pseudo noise (PN) offset for a CDMA signal, an absolute radio-frequency channel number (ARFCN) for a GSM signal, or a combination of a universal mobile telephony system terrestrial radio access absolute radio-frequency channel number (UARFCN) and a primary scrambling code (PSC) for a UMTS signal.

In some implementations, signal receiving logic 104 can be configured to detect and receive signals transmitted by wireless signal transmitters. For example, signal receiving logic 104 can be configured to detect and receive cellular signals (e.g., GSM, CDMA, UMTS). Signal receiving logic 104 can be configured to detect and receive wireless access point signals.

In some implementations, signal processing logic 106 can be configured to process signals received by signal receiving logic 104. Signal processing logic 106 can process signals transmitted from wireless signal transmitters to determine signal type (e.g., cellular, access point, GSM, CDMA, UMTS) and to extract various data from the received signals. For example, signal processing logic 106 can extract identification information that can be used to identify a wireless signal transmitter that transmitted a signal received by signal receiving logic 104. For example, signal processing logic 106 can extract a unique identifier for a wireless signal transmitter or determine non-unique signal characteristics that can be used to derive the identity of a wireless signal transmitter. A unique identifier can be a unique identifier for a cellular transmitter or a SSID or MAC address for a wireless access point. A unique identifier for a cellular transmitter can be determined when a signal is received from a cellular transmitter that is serving mobile device 100, for example. A non-unique signal characteristic can be a PN offset for a CDMA signal, an ARFCN for a GSM signal, or a combination of a UARFCN and a PSC for a UMTS signal. A non-unique signal characteristic can be used to derive the identity of neighboring transmitters (e.g., transmitters that are not currently serving mobile device 100).

In some implementations, signal processing logic 106 can extract error information that can be used to determine the quality of a signal received by mobile device 100. For example, a CDMA signal can include a root mean square (RMS) error value and a phase measurement. If phase measurement is too high or if the RMS error is too large, the received signal (and the location data derived from the signal) can be excluded from the neighbor cell averaging calculation, as described below.

Transmitter lookup logic 108 can use the extracted identification information to identify wireless signal transmitter records in transmitter cache 102 and determine locations for the identified wireless signal transmitters. For example, unique identifiers can be used to look up transmitter location information in transmitter cache 102. Non-unique signal characteristics can be used in combination with other signal data to derive the identity of a transmitter and find the transmitter location information, as described further below.

In some implementations, device locating logic 110 can perform neighbor cell location averaging. For example, device locating logic 110 can estimate the location of mobile device 100 by calculating the average of the locations of the wireless signal transmitters.

Figure 2:
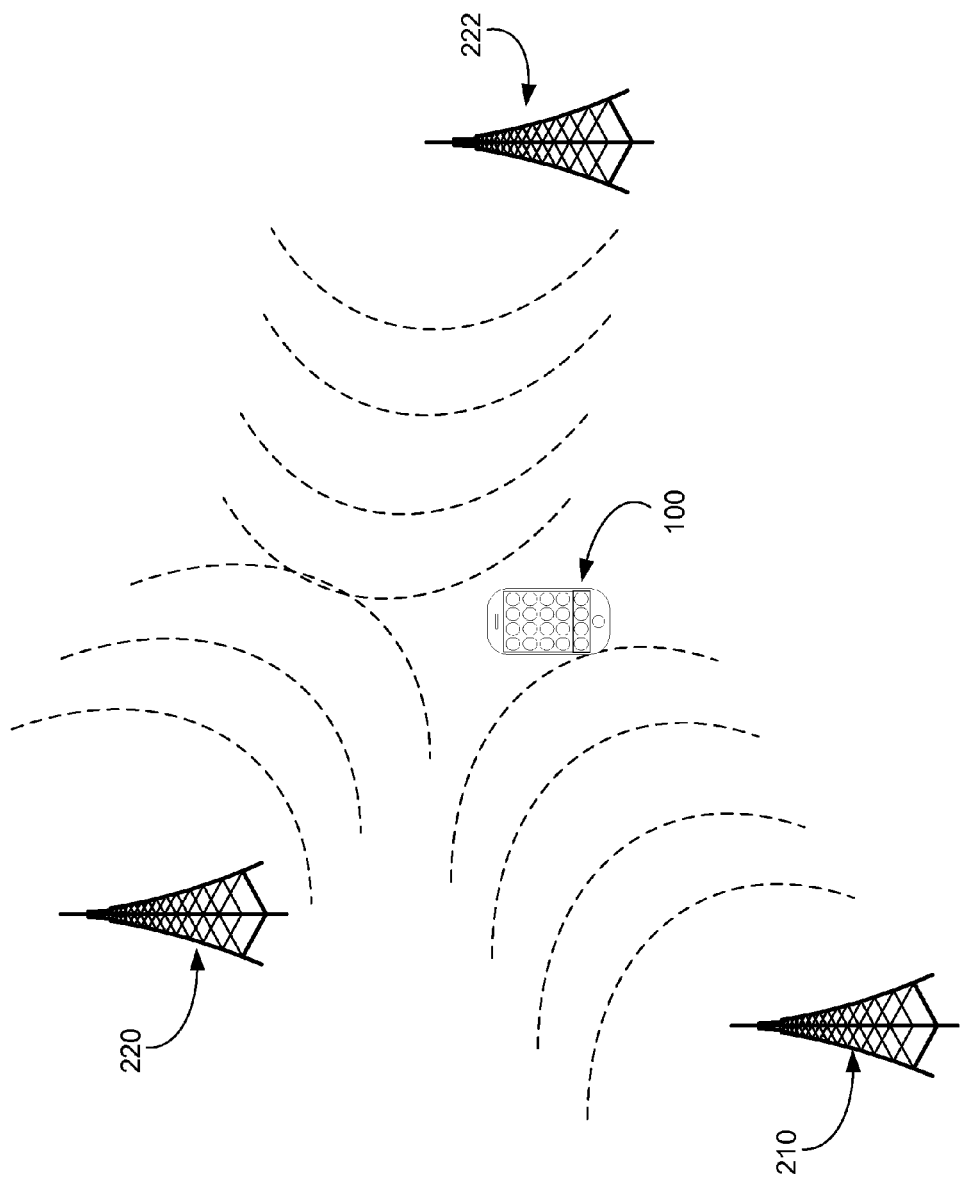
FIG. 2 illustrates an example of neighbor cell location averaging.

FIG. 2 illustrates an example of neighbor cell location averaging. In some implementations, mobile device 100 can be configured with wireless transmitter information (e.g., transmitter cache 102).

In some implementations, mobile device 100 can receive wireless signals from multiple wireless transmitters 210, 220 and 222. For example, mobile device 100 can be connected or joined to wireless transmitter 210; wireless transmitter 210 can be serving mobile device 100. For example, serving transmitter 210 can provide mobile device 100 telephony services and/or network (e.g., Internet) access. Serving transmitter 210 can transmit signals to mobile device 100 that can include a unique identifier for serving transmitter 210.

While mobile device 100 is connected to serving transmitter 210, mobile device can receive wireless signals from neighboring transmitters 220 and 222. For example, neighboring transmitters 220 and 222 can broadcast wireless signals and mobile device 100 can detect and receive the broadcast signals. Mobile device 100 can analyze the signals and derive information that can be used to identify the neighboring transmitters 220 and 222. For example, the signals received from neighboring transmitters 220 and 222 can include non-unique signal characteristics or data that can be used to derive the identities of neighboring transmitters 220 and 220. The non-unique signal characteristics can include a PN offset for a CDMA signal, an ARFCN for a GSM signal, or a combination of a UARFCN and a PSC for a UMTS signal, for example. While the signal characteristics are not unique among all wireless signal transmitters, the signal characteristics can be unique within a particular geographic region.

In some implementations, the regional uniqueness of the signal characteristics can be used to identify the neighboring transmitters. In some implementations, the unique identifier of serving transmitter 210 can be used to determine a location of serving transmitter 210. For example, mobile device 100 can use the unique identifier of serving transmitter 210 to look up the location associated with serving transmitter 210 in transmitter cache 102. The location of serving transmitter 210 can be used to identify a geographic region associated with the current location of mobile device 100. For example, the current location of mobile device 100 can be estimated to be the determined location of serving transmitter 210.

In some implementations, the location of neighboring transmitters 220 and 222 can be determined based on the signal characteristics of signals received from neighboring transmitters 220 and 222, the location of serving transmitter 210 and information in transmitter cache 102. For example, because the signal characteristics of a signal transmitted by a wireless signal transmitter are unique within a particular geographic region, a wireless signal transmitter can be identified relative to a known location. For example, once the location of serving transmitter 210 is known, the identity of a neighboring transmitter (e.g., 220 and 222) can be determined based on the signal characteristics of signals transmitted from transmitters 220 and 222.

In some implementations, based on the transmitter information in transmitter cache 102, mobile device 100 can determine the wireless signal transmitter that is geographically closest to serving transmitter 210 and that transmits signals having the determined signal characteristics. For example, mobile device 100 can search transmitter cache 102 for all transmitters that match a particular signal characteristic and then determine which of the matching transmitters is geographically closest to the location of serving transmitter 210. The closest transmitter that matches the signal characteristic can be identified as the neighboring transmitter. Once the identity of the neighboring transmitter is known, the location of the neighboring transmitter can be determined based on the transmitter information in transmitter cache 102.

In some implementations, mobile device 100 can calculate an average of the locations determined for serving transmitter 210 and neighboring transmitters 220 and 222. For example, mobile device 100 can calculate an average of the latitude and longitude coordinates associated with each transmitter using any well-known geographic location averaging or midpoint calculation method, including various weighted averaging or centroid calculation functions.

In some implementations, a weighted average can be calculated. For example, a coefficient can be assigned to the location of each transmitter for the purposes of location averaging. The coefficient can correspond to the importance of the transmitter. For example, serving transmitter 210 can be associated with a higher coefficient than neighboring transmitters 220 and 222 because mobile device 100 is connected or joined to serving transmitter 210. The location of serving transmitter 210 can be considered the most reliable (most important) location because serving transmitter 210 is serving mobile device 100. However, it is unlikely that mobile device 100 is at the same location as serving transmitter 100. Thus, the locations of neighboring transmitters 220 and 222 are included in the location averaging calculation but are given less weight in the calculation than serving transmitter 210. In some implementations, neighboring transmitters can have the same coefficient. In some implementations, a neighboring transmitter can have a coefficient that is different than another neighboring transmitter. In some implementations, the coefficient of the serving transmitter can be different than the coefficient of the neighboring transmitters.

In some implementations, mobile device 100 can calculate a weighted average of the latitude (lat) and longitude (long) coordinates associated with each transmitter. For example, if the weight (i.e., coefficient) assigned to serving transmitter 210 (S) is $w_s$, then the weight applied to the neighboring transmitters 220, 222 ($w_N$) can be expressed as (1.0−$w_S$) (e.g., $w_N$=1.0−$w_S$). The weight assigned to each transmitter can be expressed as $w_N$ divided by the number (n) of neighboring transmitters (N) included in the averaging calculation (e.g., $w_N$/n). For example, the weighted average (AVG) can be calculated according to the formula: AVG=$w_S$S(lat, long)+ $\Sigma_{i=1}^{n}(w_N N(lat_i, long_i)/n)$, where the latitude ($lat_i$) and longitude ($long_i$) values for the neighboring transmitters (N) can be multiplied by the weight $w_N$ and latitude values are summed and longitude values are summed. The latitude and longitude values for the serving transmitter (S) can be multiplied by the weight $w_S$. In some implementations, the weight ($w_S$) used for the serving transmitter (S) location is adjusted according to the number (n) of neighboring transmitters (N) to be used for the averaging calculation. For example, if n>3, then w=0.6; if n=3, then w=0.7; if n=2, then w=0.8; if n=1, then w=0.9; if n=0, then w=1.0.

In some implementations, the location of a neighboring transmitter can be excluded from the location averaging calculation. For example, if a signal received from a neighboring transmitter includes an RMS error that is too large or a phase measurement that is too high, the neighboring transmitter can be excluded from the location averaging calculation. The RMS error can be compared to a threshold RMS value to determine when the RMS error is too large. Likewise, the phase measurement can be compared to a threshold phase measurement value to determine when the phase measurement is too high.

Example Processes

Figure 3:
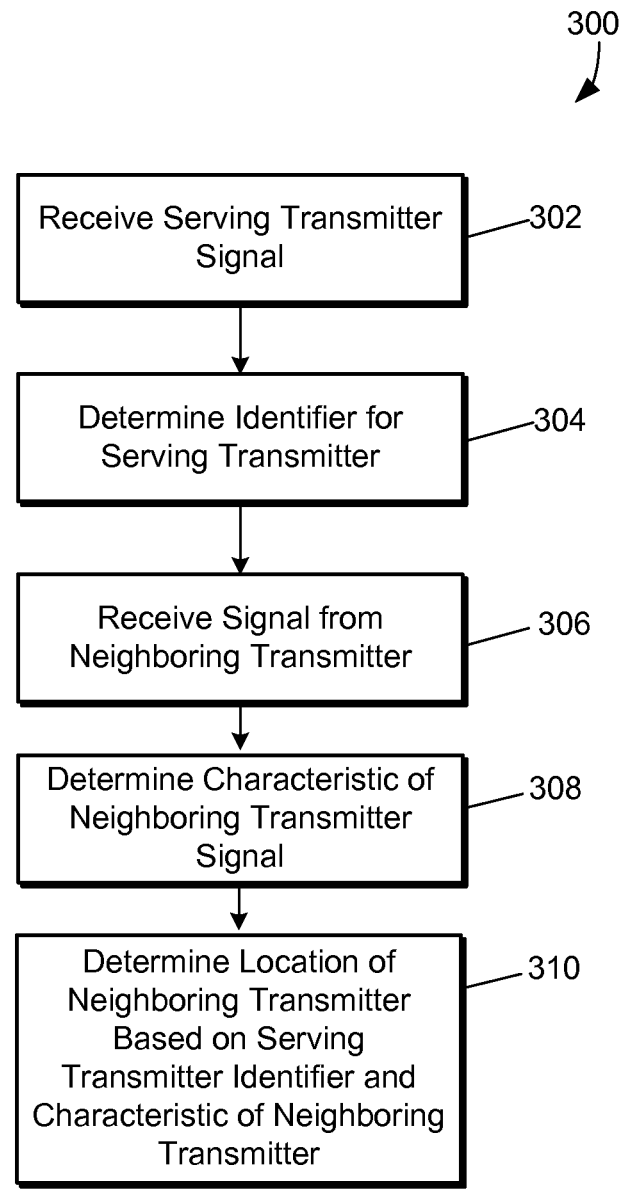
FIG. 3 is a flow diagram of an example process for determining a location of a wireless signal transmitter.

FIG. 3 is a flow diagram of an example process 300 for determining a location of a wireless signal transmitter. At step 302, a serving transmitter signal is received. For example, mobile device 100 can receive a signal from serving transmitter 210. The signal can include an identifier for serving transmitter 210. At step 304, an identifier for the serving transmitter is determined. For example, mobile device 100 can determine an identifier for serving transmitter 210 based on the signal received at step 302.

At step 306, a signal is received from a neighboring transmitter. For example, mobile device 100 can receive a signal from neighboring transmitter 220. At step 308, a characteristic of the neighboring transmitter signal is determined. For example, the signal received from neighboring transmitter 220 can have a characteristic that distinguishes the signal from other signals received at mobile device 100. The characteristic can be a non-unique characteristic among all signals transmitted by all transmitters; however, the characteristic can be unique among signals and transmitters proximate to mobile device 100 (e.g., in the same geographic region of mobile device 100). For example, a signal characteristic can include can include a PN offset for a CDMA signal, an ARFCN for a GSM signal, or a combination of a UARFCN and a PSC for a UMTS signal.

At step 310, a location of the neighboring transmitter can be determined based on the serving transmitter identifier and the characteristic of the signal transmitted by the neighboring transmitter. For example, transmitter cache 102 can be searched to determine which transmitters have signal characteristics that match the characteristics determined for the signal received from the neighboring transmitter. Once the matching transmitters have been found, the location information for each of the matching transmitters stored in transmitter cache 102 can be analyzed to determine a matching transmitter that is geographically nearest to the location of the serving transmitter. The matching transmitter that is nearest to the location of the serving transmitter can be determined to be the neighboring transmitter that sent the signal to the mobile device. Alternatively, the neighboring transmitters within a specified distance or range of the serving transmitter can be determined and then the mobile device can determine which of the neighboring transmitters matches the determined signal characteristic.

Figure 4:
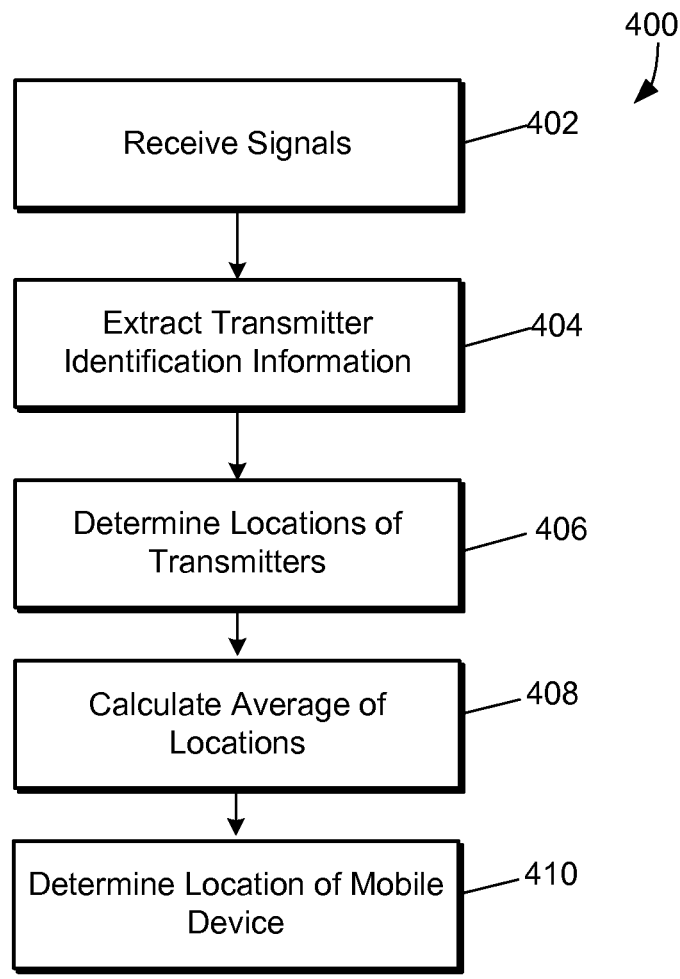
FIG. 4 is flow diagram of an example process for neighbor cell location averaging.

FIG. 4 is flow diagram of an example process 400 for neighbor cell location averaging. At step 402, signals are received from signal transmitters at a mobile device. For example, cellular signals (e.g., GSM, CDMA, UMTS) can be received from cellular signal transmitters. Wireless access point signals can be received from wireless access points.

In some implementations, the mobile device can exclude a received wireless signal, and the associated wireless signal transmitter, from the neighbor cell location averaging process. For example, if the signal received at the mobile device is a CDMA cellular signal, mobile device can extract RMS error and phase measurement data from the signal. If the RMS error is too high or if the phase measurement is too large, then the mobile device can exclude the signal, and associated transmitter, from the location averaging calculation.

At step 404, transmitter identification information is extracted from the received signals. For example, transmitter identification information can include a unique identifier (e.g., unique cellular transmitter identifier, unique wireless access point identifier (SSID, MAC address)) for the sending wireless signal transmitter. Transmitter identification information can include signal characteristics that can be used to differentiate wireless signal transmitters and derive the identity of the sending transmitter, as described above with reference to FIG. 3.

At step 406, locations of the transmitters can be determined. For example, transmitter locations can be determined as described above with reference to FIG. 3.

At step 408, an average of the transmitter locations is calculated. For example, each transmitter location can be expressed at latitude and longitude coordinates and an average of the coordinates that includes each transmitter location can be calculated. There are various well-known methods for calculating an average of locations (e.g., geographic midpoint calculations, mean latitude/longitude calculations). Any location averaging method can be used. In some implementations, a weighted average of signal transmitter locations can be calculated. For example, the location averaging calculation can be modified to include coefficients for each transmitter location, as described above.

At step 410, a location of the mobile device can be determined based on the calculated average of the wireless signal transmitter locations. For example, the location of the mobile device 100 can correspond to the calculated average, or weighted average, of the wireless signal transmitter locations.

Example Mobile Device Architecture

Figure 5:
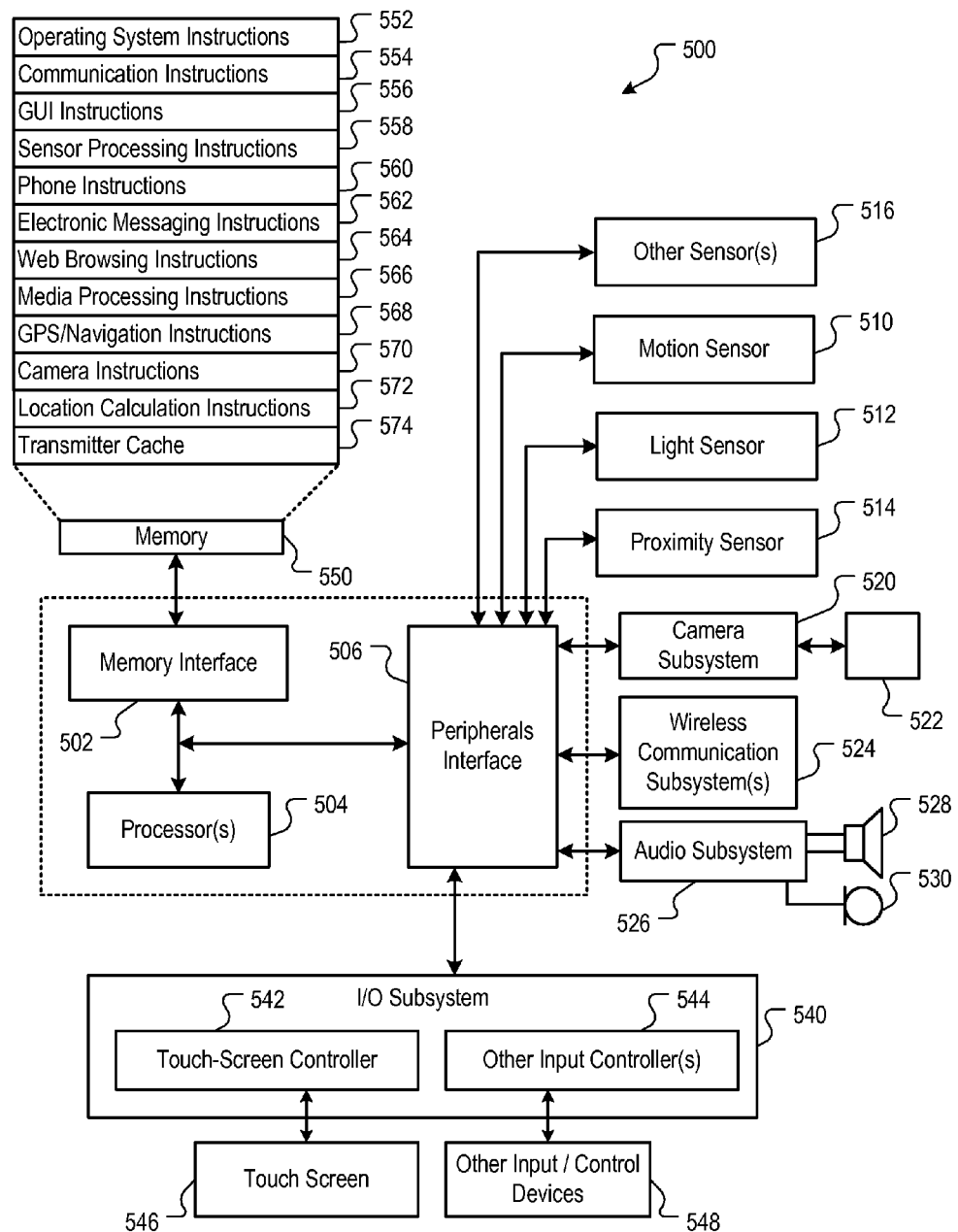
FIG. 5 is a block diagram of an exemplary system architecture implementing the features and processes of FIGS. 1-4.

FIG. 5 is a block diagram 500 of an example implementation of the mobile devices 100 of FIGS. 1-4. The mobile device 100 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the mobile device 100 can be coupled by one or more communication buses or signal lines.

Sensors, devices, and subsystems can be coupled to the peripherals interface 506 to facilitate multiple functionalities.

For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a positioning system (e.g., GPS receiver), a temperature sensor, a biometric sensor, or other sensing device, to facilitate related functionalities.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the mobile device 100 is intended to operate. For example, a mobile device 100 can include communication subsystems 524 designed to operate over a GSM network, a GPRS network, an EDGE network, a Wi-Fi or WiMax network, and a Bluetooth™ network. In particular, the wireless communication subsystems 524 can include hosting protocols such that the device 100 can be configured as a base station for other wireless devices.

An audio subsystem 526 can be coupled to a speaker 528 and a microphone 530 to facilitate voice-enabled functions, such as speaker recognition, voice replication, digital recording, and telephony functions.

The I/O subsystem 540 can include a touch screen controller 542 and/or other input controller(s) 544. The touch-screen controller 542 can be coupled to a touch screen 546. The touch screen 546 and touch screen controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch screen 546; and a pressing of the button for a second duration that is longer than the first duration can turn power to the mobile device 100 on or off. Pressing the button for a third duration can activate a voice control, or voice command, module that enables the user to speak commands into the microphone 530 to cause the device to execute the spoken command. The user can customize a functionality of one or more of the buttons. The touch screen 546 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 can, therefore, include a 36-pin connector that is compatible with the iPod. Other input/output and control devices can also be used.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes and instructions; and/or camera instructions 570 to facilitate camera-related processes and functions.

The memory 550 can store location calculation instructions 572 and transmitter cache 574 to facilitate the processes and functions described with reference to FIGS. 1-4.

The memory 550 can also store other software instructions (not shown), such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the mobile device 100 can be implemented in hardware and/or in software, including in one or more signal processing and/or application specific integrated circuits.

What is claimed is:

1. A method comprising: receiving, at a mobile device, wireless signals transmitted by a plurality of transmitters; extracting identification information and non-unique signal characteristics from the wireless signals corresponding to the plurality of transmitters, wherein the identification information includes an identifier of a serving transmitter, and the non-unique signal characteristics, alone, are insufficient for uniquely identifying a transmitter; determining a location of the serving transmitter by searching the identifier in a transmitter cache; determining neighboring transmitters that are different from the serving transmitter based on the received signal information, wherein determining the identities comprises: searching the non-unique signal characteristics in the transmitter cache to identify matching transmitters, the matching transmitters including transmitters the signal characteristics of which match the non-unique signal characteristics extracted from the wireless signals; determining locations of the neighboring matching transmitters using signal transmitter records for the matching transmitters as stored in the transmitter cache; and designating one or more matching transmitters the locations of which are geographically nearest to the location of the serving transmitter as the neighboring transmitters; calculating an average of the locations of the neighboring transmitters and the location of the serving transmitter, wherein calculating the average of the transmitter locations comprises: determining a respective weight of each neighboring transmitter that does not serve the mobile device, including determining a weight of the serving transmitter and applying the weight of the serving transmitter as a negative weight in determining the respective weight of each neighboring transmitter, wherein determining the weight of the serving transmitter is based on a count of the neighboring transmitters, wherein a greater count, up to a pre-specified limit, corresponds to a lower weight of the serving transmitter; and calculating the average by applying a respective weight to each transmitter location and determining a location of the mobile device based on the calculated average.

2. The method of claim 1, further comprising:
receiving wireless transmitter location information from a transmitter database located remotely from the mobile device; and
storing the wireless transmitter location information in the transmitter cache on the mobile device.

3. The method of claim 1, wherein calculating an average of the transmitter locations comprises:
determining a coefficient for each of the locations; and
calculating the average based, at least in part, on the coefficient for each of the locations.

4. The method of claim 1, further comprising:
determining an error measurement for each of the wireless signals;
determining that a particular one of the wireless signals has a corresponding error measurement that exceeds a threshold value;
excluding the particular wireless signal from the location determination.

5. The method of claim 1, wherein the non-unique signal characteristics include a pseudo noise (PN) offset value.

6. The method of claim 1, wherein the non-unique signal characteristics include an absolute radio-frequency channel number (ARFCN).

7. The method of claim 1, wherein the non-unique signal characteristics include a combination of universal mobile telephony system terrestrial radio access absolute radio-frequency channel number (UARFCN) and a primary scrambling code (PSC).

8. A non-transitory computer-readable medium including one or more sequences of instructions which, when executed by one or more cause the one or more processors to perform operations comprising: receiving, at a mobile device, wireless signals transmitted by a plurality of transmitters; extracting identification information and non-unique signal characteristics from the wireless signals corresponding to the plurality of transmitters, wherein the identification information includes an identifier of a serving transmitter, and the non-unique signal characteristics, alone, are insufficient for uniquely identifying a transmitter; determining a location of the serving transmitter by searching based on the identifier in a transmitter cache; determining signal characteristics of neighboring transmitters that are different from the serving transmitter based on the received signal information, wherein determining the identities comprises: searching the non-unique signal characteristics in the transmitter cache to identify matching transmitters, the matching transmitters including transmitters the signal characteristics of which match the non-unique signal characteristics extracted from the wireless signals; determining locations of the matching transmitters using signal transmitter records for the matching transmitters as stored in the transmitter cache; and designating one or more matching transmitters the locations of which are geographically nearest to the location of the serving transmitter as the neighboring transmitters; calculating an average of the locations of the neighboring transmitters and the location of the serving transmitter, wherein calculating the average of the transmitter locations comprises: determining a respective weight of each neighboring transmitter that does not serve the mobile device, including determining a weight of the serving transmitter and applying the weight of the serving transmitter as a negative weight in determining the respective weight of each neighboring transmitter, wherein determining the weight of the serving transmitter is based on a count of the neighboring transmitters, wherein a greater count, up to a pre-specified limit, corresponds to a lower weight of the serving transmitter; and calculating the average by applying a respective weight to each transmitter location and determining a location of the mobile device based on the calculated average.

9. The non-transitory computer-readable medium of claim 8, the operations comprising:
receiving wireless transmitter location information from a transmitter database located remotely from the mobile device; and
storing the wireless transmitter location information on the mobile device.

10. The non-transitory computer-readable medium of claim 8, the operations comprising:
determining a coefficient for each of the locations; and
calculating the average based, at least in part, on the coefficient for each of the locations.

11. The non-transitory computer-readable medium of claim 8, the operations comprising:
determining an error measurement for each of the wireless signals;
determining that a particular one of the wireless signals has a corresponding error measurement that exceeds a threshold value;
excluding the particular wireless signal from the location determination.

12. The non-transitory computer-readable medium of claim 8,
wherein the non-unique signal characteristics include a pseudo noise (PN) offset value.

13. The non-transitory computer-readable medium of claim 8,
wherein the non-unique signal characteristics include an absolute radio-frequency channel number (ARFCN).

14. The non-transitory computer-readable medium of claim 8,
wherein the non-unique signal characteristics include a combination of universal mobile telephony system terrestrial radio access absolute radio-frequency channel number (UARFCN) and a primary scrambling code (PSC).

15. A system, comprising: one or more processors; and a non-transitory computer-readable medium including one or more sequences of instructions which, when executed by the one or more processors, cause the one or more processors to perform operations comprising: receiving, at a mobile device, wireless signals transmitted by a plurality of transmitters; extracting identification information and non-unique signal characteristics from the wireless signals corresponding to the plurality of transmitters, wherein the identification information includes an identifier of a serving transmitter, and the non-unique signal characteristics, alone, are insufficient for uniquely identifying a transmitter; determining a location of the serving transmitter by searching the identifier in a transmitter cache; determining signal characteristics of neighboring transmitters that are different from the serving transmitter based on the received signal information, wherein determining the identities comprises: searching the non-unique signal characteristics in the transmitter cache to identify matching transmitters, the matching transmitters including transmitters the signal characteristics of which match the non-unique signal characteristics extracted from the wireless signals; determining locations of the matching transmitters using signal transmitter records for the matching transmitters as stored in the transmitter cache; and designating one or more matching transmitters the locations of which are geographically nearest to the location of the serving transmitter as the neighboring transmitters; calculating an average of the locations of the neighboring transmitters and the location of the serving transmitter, wherein calculating the average of the transmitter locations comprises: determining a respective weight of each neighboring transmitter that does not serve the mobile device, including determining a weight of the serving transmitter and applying the weight of the serving transmitter as a negative weight in determining the respective weight of each neighboring transmitter, wherein determining the weight of the serving transmitter is based on a count of the neighboring transmitters, wherein a greater count, up to a pre-specified limit, corresponds to a lower weight of the serving transmitter; and calculating the average by applying a respective weight to each transmitter location and determining a location of the mobile device based on the calculated average.

16. The system of claim 15, the operations comprising:
receiving wireless transmitter location information from a transmitter database located remotely from the mobile device; and
storing the wireless transmitter location information on the mobile device.

17. The system of claim 15, the operations comprising:
determining a coefficient for each of the locations; and
calculating the average based, at least in part, on the coefficient for each of the locations.

18. The system of claim 15, the operations comprising:
determining an error measurement for each of the wireless signals;
determining that a particular one of the wireless signals has a corresponding error measurement that exceeds a threshold value;
excluding the particular wireless signal from the location determination.

19. The system of claim 15, wherein the non-unique signal characteristics include a pseudo noise (PN) offset value.

20. The system of claim 15, wherein the non-unique signal characteristics include an absolute radio-frequency channel number (ARFCN).

21. The system of claim 15, wherein the non-unique signal characteristics include a combination of universal mobile telephony system terrestrial radio access absolute radio-frequency channel number (UARFCN) and a primary scrambling code (PSC).

* * * * *

UNITED STATES PATENT AND TRADEMARK OFFICE
CERTIFICATE OF CORRECTION

PATENT NO. : 8,938,262 B2  
APPLICATION NO. : 13/153113  
DATED : January 20, 2015  
INVENTOR(S) : Glenn Donald MacGougan et al.

Page 1 of 1

It is certified that error appears in the above-identified patent and that said Letters Patent is hereby corrected as shown below:

IN THE CLAIMS

Column 9, Line 3 (Claim 1), after "the" delete "neighboring".

Column 9, Line 54 (Claim 8), after "more" insert -- processors, --.

Column 9, Line 63 (Claim 8), after "searching" delete "based on".

Signed and Sealed this  
Sixth Day of October, 2015

Michelle K. Lee  
*Director of the United States Patent and Trademark Office*